United States Patent [19]

Trouiller

[11] 4,219,095
[45] Aug. 26, 1980

[54] ACOUSTIC TRANSDUCER

[75] Inventor: Jean-Claude Trouiller, Gif sur Yvette, France

[73] Assignee: Schlumberger Technology Corporation, New York, N.Y.

[21] Appl. No.: 921,928

[22] Filed: Jul. 3, 1978

Related U.S. Application Data

[63] Continuation of Ser. No. 799,900, May 23, 1977, abandoned, and a continuation of Ser. No. 594,404, Jul. 8, 1975, abandoned.

[30] Foreign Application Priority Data

Jul. 10, 1974 [FR] France ................................. 74 23921

[51] Int. Cl.² ............................................. G01V 1/40
[52] U.S. Cl. .................................... 181/104; 181/108
[58] Field of Search .................. 340/8 D, 8 L, 10, 11, 340/17 R, 15.5 BH, 18 R, 18 CM; 181/102, 108, 113, 402, 104–106; 310/323, 325, 328, 331, 335, 369

[56] References Cited

U.S. PATENT DOCUMENTS

| | | |
|---|---|---|
| 2,848,672 | 8/1958 | Harris .................................. 310/325 |
| 2,878,886 | 3/1959 | Overton, Jr. |
| 3,109,112 | 10/1963 | Lester .................................. 310/369 |
| 3,230,504 | 1/1966 | Horan et al. ........................ 340/10 |
| 3,617,780 | 11/1971 | Benjaminson et al. |
| 3,734,233 | 5/1973 | Wiley . |

FOREIGN PATENT DOCUMENTS 510681 10/1973 U.S.S.R. ................................. 181/104

Primary Examiner—Theodore M. Blum

[57] ABSTRACT

Illustrative embodiments of the present invention include a transducer for acoustic well logging, comprising a cylindrical hollow body which is capable of vibrating radially and longitudinally with respect to its axis, and an hemispherical cap coupled to one end of the hollow body. A transducer of this type has a directivity pattern in the range of angles of about 15° to 75° to its axis. This range includes substantially all the acoustic waves whose angles of incidence at the interface between the drilling mud and the formations fall in the range of limit refraction angles typically encountered for the drilling mud commonly used and the various different kinds of formations usually investigated.

28 Claims, 8 Drawing Figures

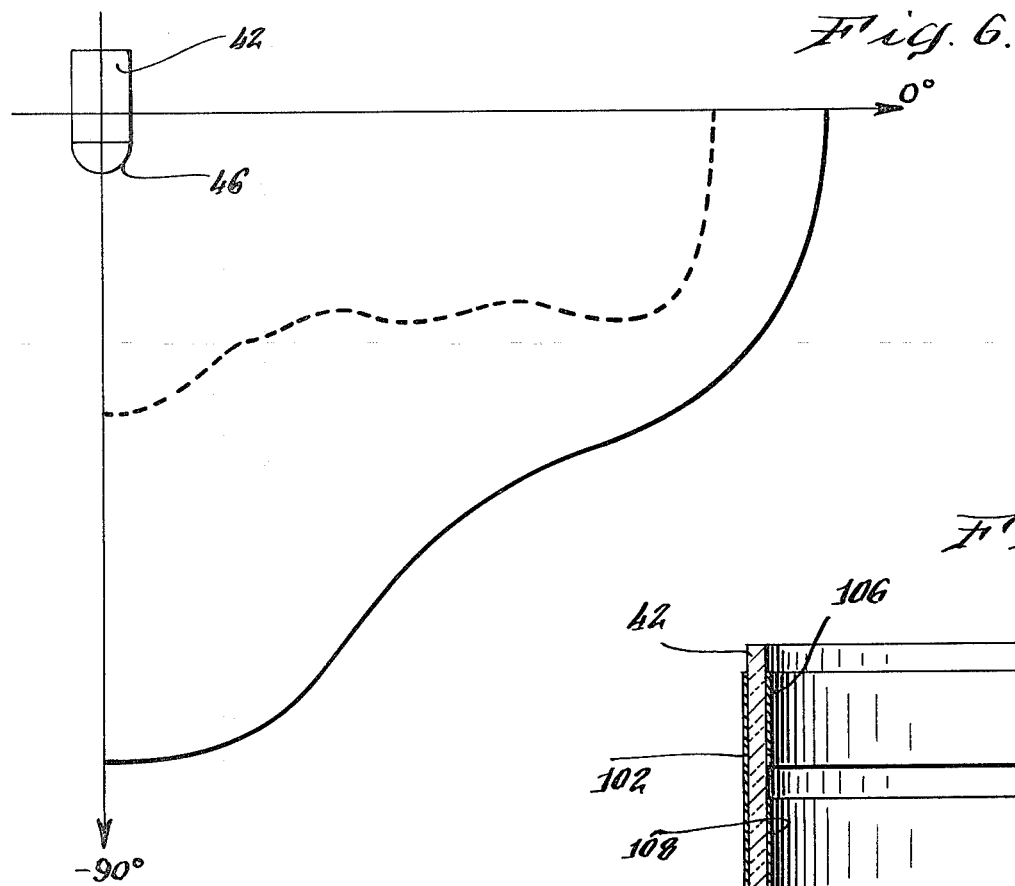
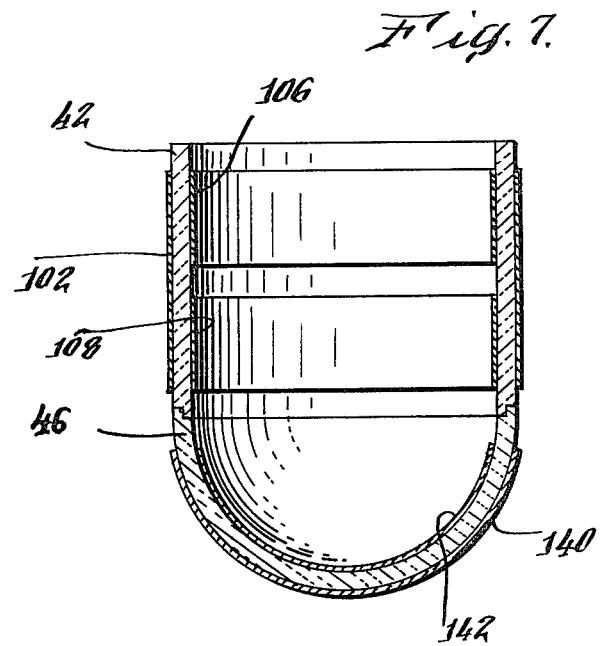
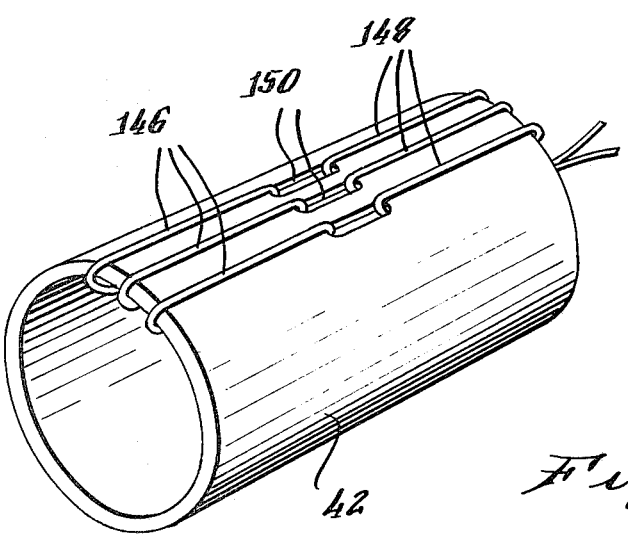

ACOUSTIC TRANSDUCER

This is a continuation of application Ser. No. 799,900, filed May 23, 1977 now abandoned and application Ser. No. 594,404, filed July 8, 1975, now abandoned.

BACKGROUND OF THE INVENTION

1. Field of the Invention

The present invention relates to acoustic transducers for emitting or receiving acoustic waves, and to acoustic well logging apparatus incorporating such transducers.

2. Description of the Prior Art

Acoustic well logging apparatus for investigating the earth formations surrounding a borehole typically comprises an elongated support structure, or sonde, adapted to be moved longitudinally of the borehole, the support structure carrying at least one acoustic emitting transducer for emitting acoustic waves into the formations, and at least one acoustic receiving transducer, longitudinally spaced from the emitting transducer, for receiving the acoustic waves after they have passed through the formations. The emitting and receiving transducers currently used are generally similar to each other, and comprise a hollow cylindrical member which is open at both ends and which is normally mounted substantially coaxially with the support structure (and therefore substantially coaxially with the borehole). The cylindrical member is usually made from a piezoelectric or magnetostrictive material, and in order to use the transducer as an emitter, the cylindrical member is excited electrically or electromagnetically to cause it to vibrate resonantly, thereby generating the acoustic waves which are propagated through the formations. Similarly, when the transducer is used as a receiver, the acoustic waves incident on it cause it to vibrate resonantly, thereby generating an electric signal representative of the acoustic waves. The acoustic waves incident on the receiving transducer follow a path in which they are propagated generally outwardly from the emitting transducer, through the drilling mud normally present in the borehole, then refracted as they enter the formations to travel in the formations generally parallel to the borehole, and then refracted again to pass back through the drilling mud to the receiving transducer. In operation, the transit time of the acoustic waves, i.e. the time taken for them to travel between the emitting and receiving transducers, is measured, and various deductions about the properties of the formations are made from these measurements. In some acoustic well logging apparatus, a plurality of emitting and/or receiving transducers is used, in order to compensate for that part of the measured transit time due to the time taken by the acoustic waves to travel through the drilling mud and to reduce errors due to any eccentricity of the transducers in the borehole.

These currently used transducers suffer from the disadvantage that they emit their maximum acoustic energy in, or are most sensitive to acoustic energy arriving from, a plane perpendicular to the axis of the cylindrical member, i.e. a plane perpendicular to the borehole axis. This is due to the fact that, when the cylindrical member vibrates, it typically vibrates both radially and longitudinally, but by virtue of the relatively large area of the cylindrical outer surface of the member, only the radial vibrations are well coupled to the medium surrounding the member. But in acoustic well logging, the useful acoustic energy is typically that which is emitted and received at angles in the range of about 15° to 75° to the borehole axis, since it is this energy which is refracted at the drilling mud/formation interface to follow the path between the emitting and receiving transducers described hereinbefore.

To overcome this problem, it has already been proposed, in copending U.S. Pat. Application Ser. No. 256,075 filed on May 23, 1972 by J. C. Trouiller, now abandoned and continued as Ser. No. 986,076 filed on July 5, 1974, to mount the transducers with the axes of their cylindrical members perpendicular to the borehole axis, preferably closely adjacent the wall of the borehole. However, this proposal still does not increase the level of emitted energy, or the sensitivity to received energy, as much as is desired in the above range of angles.

It is known to mechanically couple one vibrating end of a transducer element with a mass which is intended to transmit or receive the compressional wave energy sent from, or received by, the transducer element. A device of this type is disclosed in U.S. Pat. No. 3,421,139 to J. A. Siebert, patented Jan. 7, 1969. However, as the mass has a flat emitting or receiving surface and this surface is of greater magnitude than the vibrating end of the transducer element to which it is coupled, this mass only increases the cross-section of the beam of acoustic energy that can be emitted or received, but the amount of emitted energy or the sensitivity to received energy in directions different from that of the vibrations of the transducer element is not increased.

It has also been proposed to mount the transducer with the axis of its cylindrical member substantially coaxial with the borehole and to mechanically couple the vibrating end of the transducer with a curved member that turns the path of the acoustic energy to direct it toward the wall of the borehole. A transducer of this sort is described in U.S. Pat. No. 3,138,219 to R. B Blizard, patented June 23, 1964. However, as this transducer has a directivity pattern which is directed to only one side of the borehole, it can investigate only a restricted part of the surrounding earth formations. As a consequence of this, an acoustic well logging device incorporating a transducer of this type is very sensitive to the mechanical problems associated with maintaining the required sonde position against the side of the borehole.

It is therefore a primary object of the present invention to provide an acoustic transducer suitable for use, either as an emitter or as a receiver of acoustic waves, in acoustic well logging apparatus, which transducer has an improved distribution of emitted energy, or has an increased sensitivity to received energy, in directions at angles of about 15° to 75° to the borehole axis.

It is another object of the present invention to provide an acoustic transducer having a directivity pattern located in the aforementioned range of angles, and substantially symmetrical with respect to the borehole axis.

SUMMARY OF THE INVENTION

According to one aspect of the present invention, therefore, there is provided an acoustic transducer for emitting or receiving acoustic waves, said transducer comprising a transducer member capable of vibrating in two substantially perpendicular directions, and a coupling member, mechanically coupled to said transducer member, for acoustical coupling of the vibrations in one direction thereof with the surrounding medium in non-parallel directions between said two perpendicular directions and having a directivity pattern substantially symmetrical with respect to said one direction. The coupling member is preferably convexly curved. This coupling member may be either passive and made from a lightweight material such as titanium or aluminum, or active, that is capable of vibrating substantially independently of, but at substantially the same frequency as, the transducer member, in directions perpendicular to its own surface.

According to another aspect of the present invention, there is provided an apparatus for acoustically investigating the earth formations surrounding a borehole, said apparatus comprising an elongated support member adapted to be moved longitudinally of the borehole, at least one emitting acoustic transducer carried by said support member at a position axially spaced from the emitting transducer, for receiving said acoustic waves after their propagation in said formations, and means for generating a signal representative of the received acoustic waves, at least one of said transducers comprising a transducer member capable of vibrating in a first direction substantially parallel to the longitudinal axis of the support member and in a second direction substantially perpendicular to said axis, and a coupling member mechanically coupled to said transducer member, for acoustical coupling of the vibrations in said first direction thereof with the surrounding medium in directions between said first and second directions and having a directivity pattern substantially symmetrical with respect to said first direction.

More specifically, in either aspect of the invention, the transducer member is a hollow body which is open at both ends and capable of vibrating radially and longitudinally with respect to an axis passing through said open ends, said coupling member forming a cap which is secured to, and substantially closes, one of said ends. The body is preferably cylindrical and the coupling member is preferably hemispherical. The other end of the body advantageously abuts energy reflecting means, e.g. an annular member of a resilient material such as rubber, whereby the energy due to the longitudinal vibrations of the body arriving at said other end from the body is reflected.

In either aspect of the invention, the body may be made from a piezo-electric material or from a magnetostrictive material. In the former case, the body has at least one electrode, and preferably two axially separated electrodes, provided on one of its external and internal surface regions, and a single electrode provided on the other of these two surface regions. In the latter case, the body is provided with at least one electrode in the form of a toroidal coil coaxial with the body and wound therearound, and preferably two electrodes in the form of respective toroidal coils coaxial with the body, the coils being wound around respective axially spaced portions of the body.

Also in either aspect of the invention, the transducer may further include a second hollow body similar to but smaller in diameter than the firstmentioned body and mounted coaxially inside the first body, said second body being arranged to vibrate radially and longitudinally at substantially the same frequency as the first body and having a respective end cap member similar to but smaller than that of the first body. The end of the further body corresponding to said other end of the first body preferably abuts said energy reflecting means.

In the acoustic investigating apparatus, said at least one transducer may be the emitting transducer, and the receiving transducer may conveniently be similar thereto.

When the emitting transducer has a body made from a piezo-electric material, and first and second axially spaced electrodes provided on one of the two surface regions of the body as aforementioned, the exciting means may include means operative to effectively phase advance by a small amount the first few vibrations of that part of the body between the pair of electrodes comprising the further of the two axially separated electrodes from the receiving transducer and the electrode on the other surface region of the body with respect to the first few vibrations of the remainder of the body, whereby to reduce phase distortion errors at the receiving transducer.

When the emitting transducer has a body made from a magnetostrictive material, and first and second axially spaced toroidal coils as aforementioned, the exciting means may include means operative to effectively phase-advance by a small amount the first few vibrations of that part of the body surrounded by the coil further from the receiving transducer with respect to the first few vibrations of the remainder of the body, whereby to reduce phase distortion errors at the receiving transducer.

When the emitting transducer further includes the aforementioned second hollow body, the exciting means is preferably arranged to excite the second body to emit acoustic waves substantially in phase with those emitted by the first body.

According to a further aspect of the present invention, there is provided an acoustic transducer for emitting or receiving acoustic waves, said transducer comprising a transducer member capable of vibrating in two substantially perpendicular directions, with a convexly curved portion for acoustical coupling of the vibrations in one direction thereof with the surrounding medium in directions between said two substantially perpendicular directions.

The present invention, both as to its organization and its manner of operation, together with further objects and advantages thereof, may best be understood by reference to the following description in connection with the accompanying drawings.

BRIEF DESCRIPTION OF THE DRAWINGS

FIG. 3 is a simplified circuit diagram of a circuit for energising the transducer of FIG. 2;

FIGS. 4, 5 and 6 are explanatory diagrams relating to the operating characteristics of the transducers of FIG. 1 and FIG. 2; and FIGS. 7 and 8 show alternative embodiments of part of the transducer of FIG. 2.

DESCRIPTION OF THE PREFERRED EMBODIMENT

Figure 1:
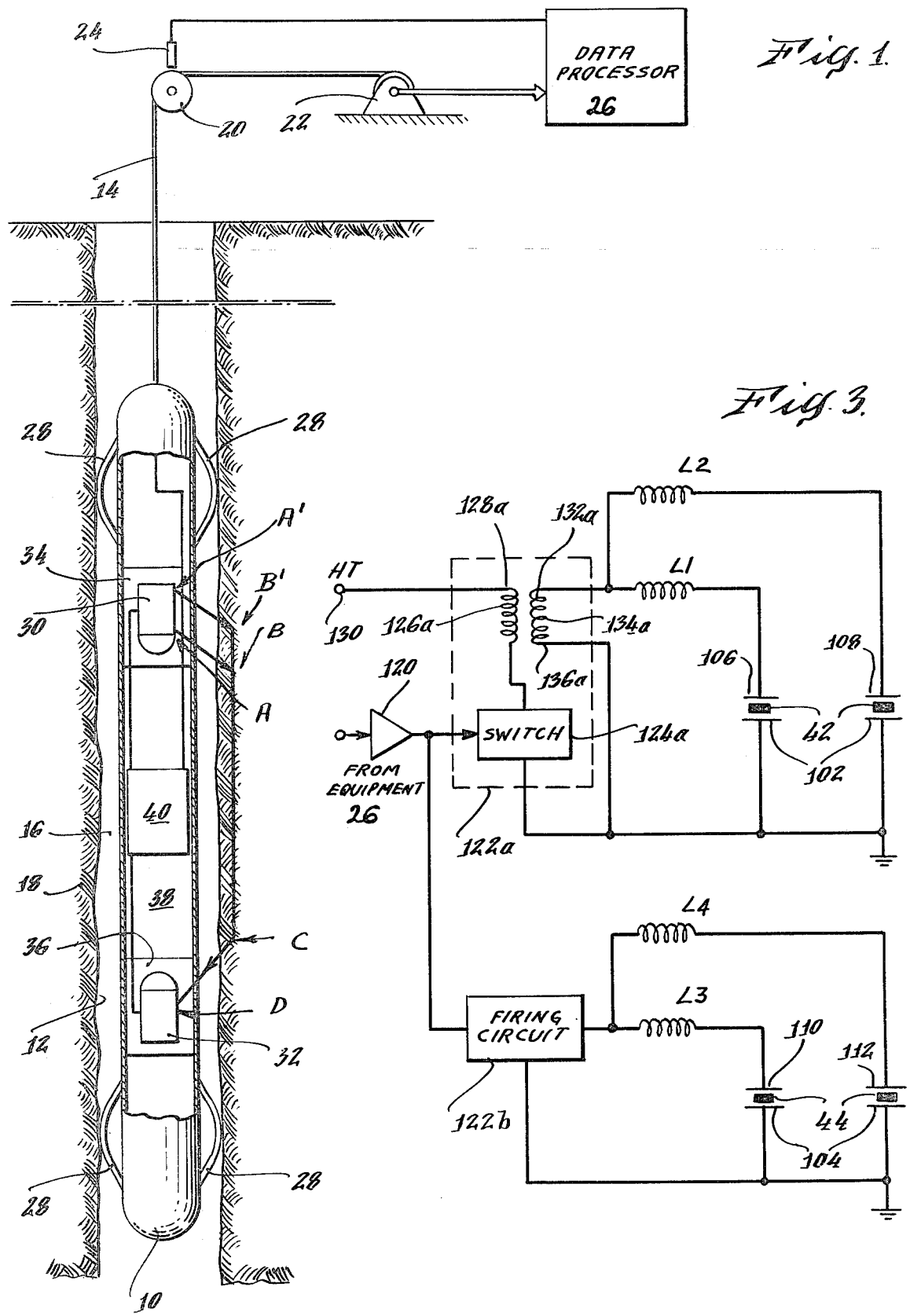
FIG. 1 is a diagrammatic representation of acoustic well logging apparatus incorporating an emitting acoustic transducer and a receiving acoustic transducer both in accordance with the present invention.

The acoustic well logging apparatus of FIG. 1 comprises an elongated substantially cylindrical support structure (or sonde) 10, which is shown suspended in a borehole 12 by means of a cable 14. The borehole 12 is normally full of drilling mud 16, at least in the region of the sonde 10, and traverses earth formations 18 which are to be acoustically investigated. The cable 14 passes over a pulley 20 at the upper end of the borehole 12, and is reeled and unreeled by means of a winch 22 positioned near the upper end of the borehole 12, in order to raise and lower the sonde 10 within the borehole. A rotation sensor 24 is associated with the pulley 20 and produces signals which are representative of the total length of the cable 14 reeled or unreeled, and which are therefore representative of the depth of the sonde 10 in the borehole 12. The signals produced by the sensor 24 are applied to suitable data processing equipment 26 of known kind, where they are combined with signals which are produced within the sonde 10 as will hereinafter become apparent, and which are transmitted to the equipment 26 via a plurality of conductors (not shown) contained within the cable 14 and a slip ring arrangement (not shown) provided in the winch 22.

The sonde 10 is provided adjacent its upper and lower ends with a plurality of spring-like centralising blades 28, which are equiangularly spaced around its circumference and which serve to centralise the sonde in the borehole 12. The sonde 10 further includes an emitting acoustic transducer 30 and a receiving acoustic transducer 32, which are mounted in respective recesses 34, 36 axially spaced apart along the length of the sonde, typically by three feet. The transducers 30, 32 are generally similar to each other, and are substantially circular in cross-section, both of them being mounted coaxially with the sonde 10 (and therefore coaxially with the borehole 12). The portion 38 of the sonde 10 between the transducers 30, 32 may, if desired, be a periodic structure of elastically interconnected masses, as described in more detail in U.S. Patent application Ser. No. 256,074 filed May 23, 1972 by J. C. Trouiller, now abandoned and continued as Ser. No. 550,787 filed on Feb. 18, 1975, which serves as a low pass acoustic filter to attenuate substantially the direct transmission of acoustic waves through the sonde 10 from the transducer 30 to the transducer 32.

Also included within the sonde 10 is a suitable circuit 40 for energising the transducer 30 to cause it to emit acoustic waves, and for producing a signal representative of the acoustic waves received by the transducer 32. The circuit 40 transmits timing signals, indicative of the instant of energisation of the transducer 30 and the instant of receipt of the corresponding acoustic waves by the transducer 32, to the equipment 26 as already mentioned.

Figure 2:
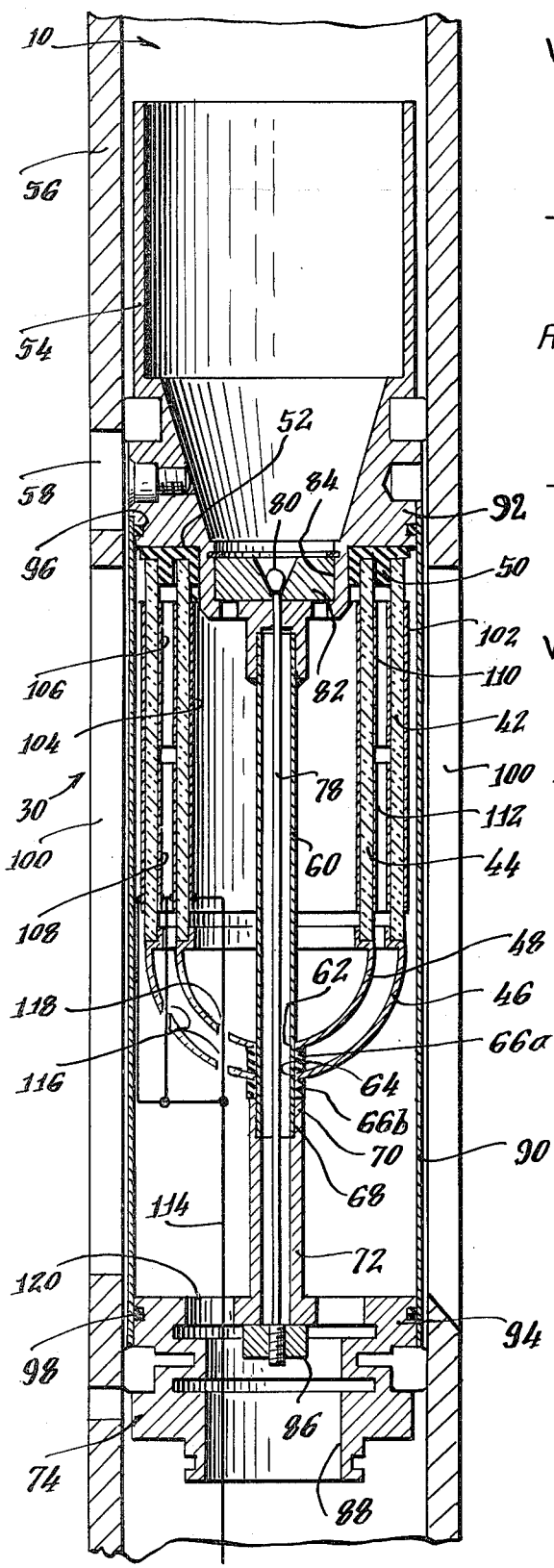
FIG. 2 is an axial cross-section of part of the apparatus of FIG. 1, showing the emitting acoustic transducer in more detail.

The transducer 30 is shown in more detail in FIG. 2, and comprises outer and inner hollow cylindrical members, or shells, 42, 44, both made from an electrically polarised piezo-electric ceramic material such as lead titanate zirconate, and both mounted coaxially with the sonde 10 in the recess 34. The shells 42, 44 are of the same axial length and their respective open ends are axially aligned with each other, but the shell 42 is polarised in the radially outward direction while the shell 44 is polarised in the radially inward direction. The lower end of each of the cylindrical members 42, 44 (i.e. the end nearer to the receiving transducer 32) is substantially closed by a respective lightweight hemispherical end cap, 46 and 48, these end caps being of the same diameter as their respective shells and thus concentric with each other. The caps 46, 48 are typically made of titanium or aluminum, and are carefully soldered or bonded with a suitable epoxy resin to their respective shells so as to ensure good acoustic coupling between each shell and its cap. The other end of each of the shells 42, 44 abuts a common annular member 50, which is coaxial therewith and made from a material having good acoustic energy reflecting properties, e.g. a synthetic rubber.

The annular member 50 is supported on an annular radially-extending shoulder 52 formed on an annular steel support member 54, which is disposed coaxially inside the sonde 10 and bolted to the cylindrical wall 56 thereof by bolts 58. The support member 54 has a hollow tube 60 coaxially brazed thereto, the tube 60 extending inside the shells 42, 44 along the common axis thereof. The tube 60 passes through respective aligned apertures 62, 64 in the caps 46, 48, and is a close fit within two washers 66a, 66b, which are made of the same material as the annular member 50: the first washer 66a serves as a spacer between the caps 46, 48, and the second washer 66b is positioned just below the cap 46. The end 68 of the tube 60 projecting beyond the caps 46, 48 fits inside the end 70 of another hollow tube 72, which extends coaxially towards the support member 54 from another annular steel support member 74. The tube 72 is integral with the support member 74, and its end 70 abuts the washer 66b. The support member 74 is axially movable within the sonde 10, and is sealed from the portion of the interior of the sonde 10 below the member 74, which portion communicates with the drilling mud 16, by a flexible bellows (not shown).

The whole assembly comprising the support members 54, 74, the shells 42, 44, the caps 46, 48, the annular member 50 and the washers 66a, 66b is clamped together axially by a tie-rod 78, which extends along the inside of the tubes 60, 72 from the support member 54 to the support member 74. The tie-rod 78 has an enlarged head 80, which engages a washer-like member 82 trapped in a coaxially-disposed recess 84 in the support member 54, and its other end is threaded to receive a nut 86 located in another coaxially-disposed recess 88 in the support member 74.

A thin, relatively flexible, cylindrical steel sleeve 90 fits over and extends coaxially between respective radially outwardly-facing cylindrical surface regions 92, 94 provided on the support members 54, 74, the diameter of the sleeve 90 being greater than that of the outer shell 42 but just less than the internal diameter of the wall 56 of the sonde 10. The shells 42, 44 and the tubes 60, 72 are thus completely enclosed by the sleeve 90, which is sealed with respect to the surfaces 92, 94 by respective O-rings 96, 98. The space within the sleeve 90, including the space between the shells 42, 44 and their respective caps 46, 48 and the space inside the shell 44 and cap 48, is filled with clean oil, which is maintained at substantially the same pressure as that of the drilling mud 16 surrounding the sonde 10 by the action of the bellows mentioned earlier. The wall 56 of the sonde 10 adjacent the sleeve 90 is provided with two circumferentially spaced windows 100, whose axial extent is almost equal to the axial length of the sleeve 90 and which together extend round most of the circumference of the wall 56.

The external cylindrical surface regions of the shell 42 and the internal cylindrical surface regions of the shell 44 have respective negative electrodes 102, 104 deposited thereon, e.g. by plasma spraying, while the internal cylindrical surface regions of the shell 42 and the external cylindrical surface regions of the shell 44 each have two axially separated positive electrodes 106, 108 and 110, 112, deposited thereon. All the electrodes extend around the entire circumference of the respective surface regions on which they are deposited. Also, the electrodes 106, 108 are substantially equal to each other in axial extent, and are together substantially equal in axial extent to the electrode 102, while a similar relationship exists between the electrodes 104, 110 and 112. The electrodes 102 and/or 108 are axially spaced from the cap 46, while the electrodes 104 and/or 112 are similarly spaced from the cap 48, to ensure that the caps do not short-circuit the electrodes. The electrodes are all connected via respective conductors 114 to the circuit 40 (which is not shown in FIG. 2 but which is located below the support member 74). Apertures 116, 118 and 120 are provided in the caps 46, 48 and the support member 74 respectively for respective ones of the conductors 114.

The transducer is substantially similar to the transducer 30, and is similarly mounted within the sonde 10 with its hemispherical caps directed towards the caps 46, 48 of the transducer 30 (i.e. the transducer 32 is mounted so as to be inverted with respect to the transducer 30). However, a single positive electrode is employed in place of each pair of positive electrodes corresponding to the electrodes 106, 108 and 110, 112 and if desired, the inner shell and cap of the transducer 32, corresponding to the shell 44 and cap 48 of the transducer 30, may be omitted for the sake of simplicity.

The part of the circuit 40 which energises the transducer 30 to cause it to emit acoustic waves is shown in FIG. 3, and includes an input amplifier 120 which is connected to receive and amplify pulses supplied thereto by the equipment 26 via the cable 14. The output of the amplifier 120 is connected to two substantially identical firing circuits 122a and 122b, which are respectively connected to energise the shells 42, 44. The circuit 122a comprises a normally non-conductive switch 124a, which is connected in series with the primary winding 126a of a step-up transformer 128a between a source 130 of high voltage, typically 400 volts, and earth. One end 132a of the secondary winding 134a is connected via an inductor L1 to the electrode 106 and via an inductor L2 to the electrode 108, while the other end 136a is connected to the electrode 102. The circuit 122b comprises a switch 124b and transformer 128b which are connected as in the circuit 122a, and is similarly connected to the electrodes 110, 112 via respective inductors L3 and L4 and to the electrode 104.

In operation, the sonde 10 is lowered into the borehole 12 to a depth equal to or just greater than the depth of the earth formations 18 to be acoustically investigated, and is then moved upwardly in the borehole 12 at a substantially constant speed by means of the cable 14 and the winch 22. During this upward movement, the circuit 40 operates under the control of the equipment 26 to periodically excite the shells 42, 44 of the emitting transducer 30, typically twenty times a second, to vibrate resonantly. Each excitation is achieved by applying a pulse to the amplifier 120, which amplifies the pulse and applies it to the firing circuits 122a and 122b to render the respective switches 124a and 124b therein conductive. As each of the switches 124a, 124b is rendered conductive, it generates a voltage step of about 400 volts across the primary winding of its respective transformer 128a or 128b, as shown in FIG. 4(a). The transformers 128a and 128b typically have a primary to secondary turns ratio of about 1:6, and so each produce an output voltage step of about 2400 volts across their respective secondary windings. These 2400-volt steps excite each of the respective portions of the shells 42, 44 between the four electrode paars 106 and 102, 108 and 102, 110 and 104, 112 and 104 to vibrate resonantly at substantially the same frequency and substantially in phase with each other, these frequencies being determined by the capacitance of the electrode pair and the value of the inductor connected in series therewith. The variation with time of the amplitude of this vibration, for the portion of the shell 42 between the electrode pair 106, 102 is shown by the full line in FIG. 4(b) and it can be seen that the amplitude of succeeding half cycles increases relatively rapidly to a maximum, and then decreases relatively rapidly. This rapid increase and decrease is substantially assisted by the presence of the caps 46, 48 which reduce the Q factor of their respective shells 42, 44 and thereby increase their respective responses to step signals while increasing damping. Although the respective electric fields generated in the shells 42, 44 by the voltage steps are in opposite directions, it will be recalled that so also are the respective directions of polarisation of the shells: this ensures that the shells 42, 44 vibrate substantially in phase with each other.

For reasons which will become apparent hereafterc the respective values of the inductors L1 to L4 are adjusted so that the respective frequencies of vibration of the respective portions of the shells 42, 44 between the upper electrode pairs 106 and 102, 110 and 104 are substantially the same as each other but slightly higher than the respective frequencies of vibration of the respective portions of the shells 42, 44 between the lower electrode pairs 108 and 102, 112 and 104. This effect is illustrated by the dotted line in FIG. 4(b), which shows the variation with time of the amplitude of the vibration of the portion of the shell 42 between the lower electrode pair 108 and 102. The result of this effect is that at least the first few half cycles of vibration of the upper halves of the shells 42, 44 are effectively slightly phase-advanced with respect to the first few half cycles of vibration of the lower halves of the shells 42, 44. It will be appreciated that the foregoing description of the vibrations of the upper and lower halves of the shells 42, 44 is somewhat simplified for the sake of clarity, since in practice the vibrations of the upper and lower halves of a single shell are strongly coupled.

Figure 5:
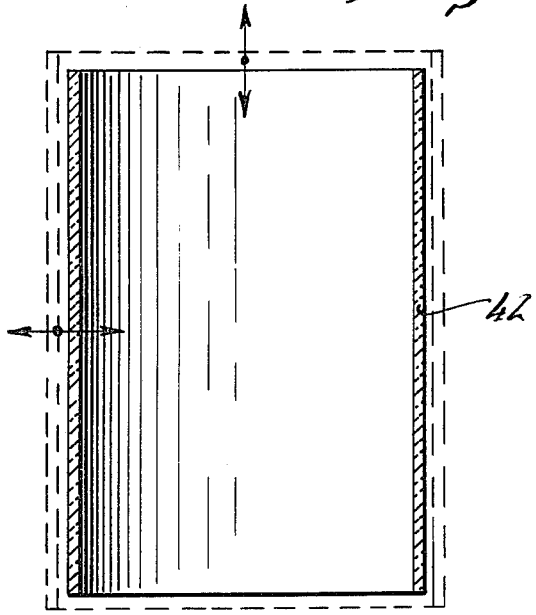

The vibration modes of the shell 42 are illustrated somewhat diagrammatically in FIG. 5, from which it can be seen that the shell vibrates both radially and longitudinally, the radial expansions and contractions being in phase with the longitudinal expansions and contractions. The radial vibrations are acoustically well-coupled, by virtue of the relatively large external surface area of the shell 42, to the oil surrounding the shell 42, and thus generate acoustic waves which travel generally radially outwardly through the oil, and through the sleeve 90 (which is effectively transparent to the acoustic waves by virtue of its thin flexible construction) and windows 100, into the drilling mud 16, and thence into the formations 18. The drilling mud 16 and oil have similar coefficients of refraction, so very little refraction occurs at the sleeve 90. In the absence of the cap 46, the longitudinal vibrations of the shell 42 would not be well-coupled to the oil around the cap, and would therefore not contribute very greatly to the generation of acoustic waves. However, the provision of the cap 46 ensures that the longitudinal vibrations of the shell 42 are well-coupled to the oil around the cap, and thus generate acoustic waves which are propagated generally perpendicularly to the hemispherical surface of the cap. Additionally, the provision of the member 50 ensures that the energy incident thereon due to the longitudinal vibrations of the shell 42 is substantially all reflected to the other end of the shell 42, to be radiated as acoustic waves by the cap 46.

The inner shell 44 and its cap 48 generate acoustic waves in a manner exactly analogous to that of the shell 42 and cap 46. As already mentioned, the shell 44 has the same axial length as the shell 42, and vibrates at substantially the same resonant frequency as, and substantially in phase with, the shell 42. This ensures that the acoustic waves produced by the two shells and their respective caps are also substantially in phase, so that the respective energies of these waves are combined additively.

The resulting directivity pattern of the acoustic energy emitted by the transducer 30 is shown in polar coordinates by the full line in FIG. 6, where it can be seen that the energy due to the caps is summed with that due to the shells to substantially increase the energy distribution in the range of angles of about 15° to 75° to the axis of the transducer 30 in the downward direction compared to the energy distribution in this range of angles in the absence of the caps; the directivity pattern of the acoustic energy emitted by a conventional single cylinder transducer having no end cap is shown in dotted lines in FIG. 6. It can further be seen that the energy distribution of the transducer 30 is also more uniform in magnitude over this range than that of the conventional transducer. This range includes substantially all the acoustic waves whose angles of incidence at the interface between the drilling mud and the formations fall in the range of limit refraction angles typically encountered for the drilling mud commonly used and the various different kinds of formations usually investigated.

The acoustic waves emitted by the transducer 30 and having an angle of incidence at the drilling mud/formation interface substantially equal to the limit refraction angle typically follow a path such as that shown in ABCD in FIG. 1. Thus they are emitted by the transducer 30 at A and are propagated through the drilling mud 16 to the drilling mud/formation interface at B, and are refracted at this interface to travel downwardly through the formations 18 substantially parallel to the axis of the borehole 12. The acoustic waves are then refracted again at the drilling mud/formation interface to re-enter the drilling mud at C, and pass to and are sensed by the transducer 32 at D.

The acoustic waves incident on the transducer 32 cause it to vibrate resonantly, since the frequency of the waves is substantially equal to the resonant frequency of the shells of the transducer 32. The effect of the acoustic waves incident on the respective caps is summed with the effect of the acoustic waves incident on the shells themselves to augment the amplitude of the vibrations of the shells in a manner analogous to the augmentation of emitted waves described in connection with the transducer 30. These vibrations generate an electrical signal representative thereof between the electrodes of the transducer 32, which electric signal is applied to the circuit 40 and suitably processed therein.

It will be noted from FIG. 1 that there exist paths between the transducers 30 and 32, such as that shown at A'B'CD, whose lengths differ from that of the path ABCD. If the dimensions of the transducers 30, 32 are significant compared to the wavelength of the acoustic waves, which is normally the case in practice, this can lead to phase distortion errors. It is to reduce these errors that the shells 42, 44 are energised, as described earlier, so that the acoustic waves generated by the portions of the shells between the upper electrode pairs 106 and 102, 110 and 104 (i.e. the acoustic waves which have the longer paths to travel) are slightly phase-advanced with respect to the acoustic waves generated by the portions of the shells between the lower electrode pairs 108 and 102, 112 and 104.

Figure 4:
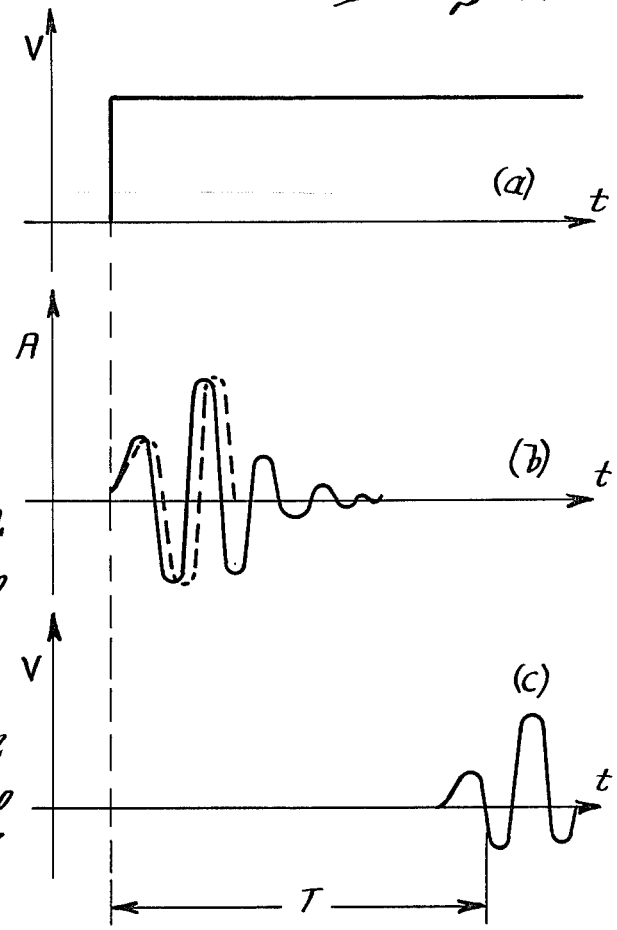

The variation with time of the amplitude of the corresponding acoustic waves incident on the transducer 32 is shown in FIG. 4 at (c), the electrical output signal produced by the transducer 32 exhibiting a similar waveform. Typically, the circuit 40 includes a threshold detector set to detect the second or third half cycle of this incident waveform and to produce a timing signal representative of this detection. As already mentioned, the circuit 40 transmits this timing signal together with a timing signal indicating the instant of the step voltage of FIG. 4(a) to the equipment 26, which measures the time T therebetween in any convenient manner and records the measured time as a function of depth.

FIG. 7 shows an alternative embodiment of the transducer 30, like parts of which have the same reference numerals. In the embodiment of FIG. 7, the end cap 46 of the shell 42 is made from the same piezo-electric material as the shell 42, instead of from titanium or aluminium, and has respective electrodes 140, 142 deposited over the greater part of its external and internal spherical surfaces. The length and diameter of the shell 42, and therefore the diameter of the end cap 46, are selected to ensure that the shell 42 and the end cap 46 have approximately the same resonant frequency. The electrodes 140, 142 are connected via a respective inductor to the output of the firing circuit 122a of FIG. 3, the value of this inductor being chosen to ensure that the shell 42 and the cap 46 vibrate at substantially the same frequency. Thus, in operation, the end cap 46, in addition to coupling the longitudinal vibrations of the shell 42 to the oil around the end cap, is also excited to vibrate in its own right, that is substantially independently of the shell 42, but at the same frequency as and in phase with the shell 42. It will be appreciated that the end cap 48 of the inner shell 44 of FIG. 2, and the end cap of the receiving transducer 32, can be similarly modified if desired.

Many modifications may be made to the described embodiment of the invention. For example, the shells 42, 44 can be made from a steel/nickel magnetostrictive material, instead of from a piezo-electric material. In this case, the electrodes 102, 104, 106, 108, 110, 112 are replaced by two pairs of axially spaced toroidal coils, one pair coaxial with each of the shells, and the inductors L1 to L4 are replaced by respective capacitors. The coils of each pair are wound around axially spaced portions of their respective shells, so that the portions form the respective cores on which the coils are wound, the shells having suitably positioned holes therein to permit this. This is illustrated for the shell 42 in FIG. 8, the coils being indicated at 146 and 148 and the holes being indicated at 150.

Additionally, two receiving transducers such as the transducer 32 may be employed, in which case the difference in the respective times taken by the acoustic waves to reach each of the receiving transducers is measured to compensate for the time taken by the acoustic waves to propagate through the oil and drilling mud. However, a second emitting transducer identical to the transducer 30 may be employed in a four transducer system similar to that described in U.S. Pat. No. 3,257,639. In this case however, since the two receiving transducers are disposed between the two emitting transducers and therefore receive acoustic waves travelling both generally upwardly and downwardly with respect thereto, each receiving transducer will be in fact constituted by a pair of longitudinally spaced apart transducers in accordance with the present invention so that the directivity pattern of the transducers be directed upwardly and downwardly respectively.

The above described embodiments are, therefore, intended to be merely exemplary and all such variations and modifications are intended to be included within the scope of the invention as defined in the appended claims.

What is claimed is:

1. A transducer for emitting into or receiving from a surrounding medium acoustic waves, comprising the combination of:
   a substantially cylindrical hollow body subject to vibration in radial and longitudinal directions with respect to its axis;
   electrode means, coupled to cylindrical surface regions of said hollow body, for providing a vibration exciting electric field in said surface regions in response to an applied signal or detecting an electric field in said surface regions in response to the impact of acoustic energy;
   means, secured to an axial end of said hollow body, for effecting acoustic energy coupling of said hollow body, with said surrounding medium in directions of vibration which are in addition to said radial and longitudinal directions, and which additional directions are non-parallel and having a directivity pattern substantially symmetrical to the axis of the hollow body; and
   means, secured to the other axial end of said hollow body, for effecting reflection of incident vibration energy.

2. The transducer of claim 1, wherein said acoustic coupling effecting means is also capable of vibrating substantially independently, but at substantially the same frequency as, the hollow body.

3. The transducer of claim 1, wherein said acoustic coupling member comprises a piezo-electric material.

4. The transducer of claim 1, wherein said acoustic coupling member comprises:
   a convexly curved cap of rigid material, rigidly secured to, and substantially closing, one axial end of said hollow body.

5. The transducer of claim 4, wherein said cap is substialy hemispherical.

6. The transducer of claim 1, wherein said hollow body is made from a piezo-electric material and wherein said electrode means comprises a pair of electrodes which respectively abutt inner and outer surfaces of said hollow body.

7. The transducer of claim 1, wherein said electrode means comprises a pair of electrodes which are provided on one of the surfaces of said hollow body.

8. The transducer of claim 1, wherein said hollow body is made from a magneto-strictive material and has wherein said electrode means comprises a toroidal coil wound there around.

9. The transducer of claim 8, wherein said electrode means comprises two coils wound around respective axially spaced portions of said hollow body.

10. The transducer of claim 1, wherein said reflecting means comprises a member of a resilient material attached to the other axial end of said hollow body.

11. The transducer of claim 1, further comprising a second hollow body similar to, but smaller in diameter than, the first-mentioned hollow body and mounted coaxially inside said first body, said second body being subject to vibration in radial and longitudinal directions at substantially the same frequency as the first body.

12. An apparatus for acoustically investigating the earth formations surrounding a borehole, comprising an elongated support member adapted to be moved longitudinally in the borehole, at least one acoustic transducer carried by said support member, means for exciting said transducer to emit acoustic waves for propagation in said formations generally parallel to the borehole axis, at least one receiving acoustic transducer carried by said support member at a position axially spaced from the emitting transducer, for receiving said acoustic waves after their propagation in said formations, and means for generating a signal representative of the acoustic waves received by said receiving transducer, at least one of said transducers comprising a transducer member in the form of a substantially cylindrical hollow body subject to vibration in radial and longitudinal directions with respect to its axis which is substantially parallel to the longitudinal axis of the support member, electrode means for providing vibration-exciting electric field in surface regions of said hollow body, means secured to an axial end of said hollow body, for effecting acoustic energy coupling of said hollow body with a surrounding medium in directions of vibration which are in additional to said radial and longitudinal directions and which additional directions are non-parallel and, have a directivity pattern substantially symmetrical to the axis of the hollow body, and energy-reflecting means coupled to the other end of said hollow body; wherein said hollow body is made from a piezo-electric material and wherein said electrode means comprises two axially separated electrodes which are provided on the same surface region in addition to an electrode provided on the other surface region of the hollow body; and wherein said at least one transducer is the emitting transducer and said exciting means includes means operative for effecting a phase-advance by a small amount of the first few vibrations of the part of the hollow body between the pair of electrodes comprising the further of the two axially separated electrodes from the receiving transducer and said electrode on the other surface region of said body with respect to the first few vibrations of the remainder of the body, whereby to reduce phase distortion errors at the receiving transducer.

13. The apparatus of claim 12, wherein said at least one transducer is the emitting transducer.

14. The apparatus of claim 12, wherein said receiving transducer and said emitting transducer are substantially similar.

15. The apparatus of claim 12, wherein said phase-advancing means comprises inductances of different values connected respectively in series with each of said two axially separated electrodes.

16. An apparatus for acoustically investigating the earth formations surrounding a borehole, comprising an elongated support member adapted to be moved longitudinally in the borehole, at least one acoustic transducer carried by said support member, means for exciting said transducer to emit acoustic waves for propagation in said formations generally parallel to the borehole axis, at least one receiving acoustic transducer carried by said support member at a position axially spaced from the emitting transducer, for receiving said acoustic waves after their propagation in said formations, and means for generating a signal representative of the acoustic waves received by said receiving transducer, at least one of said trandsducers comprising a transducer member in the form of a substantially cylindrical hollow body, made of magneto-strictive material, subject to vibration in radial and longitudinal directions with respect to its axis which is substantially parallel to the longitudinal axis of the support member, two axially spaced coils for providing vibration-exciting electric field in surface regions of said hollow body, means secured to an axial end of said hollow body, for effecting acoustic energy coupling of said hollow body with a surrounding medium in directions of vibration which are in addition to said radial and longitudinal directions, and which additional directions are non-parallel and, have a directivity pattern substantially symmetrical to the axis of the hollow body, and energy-reflecting means coupled to the other end of said hollow body; wherein said at least one transducer is the emitting transducer and said exciting means includes means operative for effecting a phase-advance by a small amount of the first few vibrations of that part of the body surrounded by the coil further from the receiving transducer with respect to the first few vibrations of the remainder of the body, whereby to reduce phase distortion errors at the receiving transducer.

17. The apparatus of claim 12, wherein said acoustic coupling means comprises a piezo-electric material and has one electrode provided on each of its external and internal surfaces.

18. The apparatus of claim 17, wherein said exciting means is connected to excite said piezo-electric material of said acoustic coupling means, so that it vibrates substantially in phase with the part of the hollow body nearer thereto.

19. The apparatus of claim 12, further comprising a second transducer member which is a hollow body similar to but smaller in diameter than, said first-mentioned hollow body and mounted coaxially inside said first body, and a second acoustic coupling means which is secured to, and substantially closes, one of the ends of said second body, said energy-reflecting means being also mechanically coupled to the other end of said second body.

20. The apparatus of claim 19, wherein said exciting means is arranged to excite said second body so that this body vibrates substantially in phase with said first body.

21. An acoustic transducer for emitting or receiving acoustic waves, comprising a combination of:
a transducer member in the form of a substantially cylindrical hollow body open at both axial ends and capable of vibrating radially and longitudinally with respect to its axis;
a convexly curved cap of rigid material, rigidly secured to, and substantially closing, one axial end of said transducer member, for generating acoustic waves in response to the longitudinal vibrations of the transducer member or inducing longitudinal vibrations in the transducer member upon receiving acoustic waves from the surrounding medium, to improve the acoustic coupling of the transducer with the surrounding medium in directions which are between the directions of vibration of said transducer member and have a directivity pattern substantially symmetrical with respect to said axis;
energy-reflecting means mechanically coupled to the other end of said transducer member; and
a second transducer member which is a hollow body similar to, but smaller in diameter than, the first-mentioned hollow body and mounted coaxially inside said first body, said second body being arranged to vibrate radially and longitudinally at substantially the same frequency as the first body, and a second convexly curved cap of rigid material which is rigidly secured to, and substantially closes, one of the ends of said second body, said enery-reflecting means being also mechanically coupled to the other end of said second body.

22. An apparatus for acoustically investigating the earth formations surrounding a borehole, comprising an elongated support member adapted to be moved longitudinally of the borehole, at least one emitting acoustic transducer carried by said support member, means for exciting said emitting transducer to emit acoustic waves for propagation in said formations generally parallel to the borehole axis, at least one receiving acoustic transducer carried by said support member at a position axially spaced from the emitting transducer, for receiving said acoustic waves after their propagation in said formations, and means for generating a signal representative of the acoustic waves received by said receiving transducer, at least one of said transducers comprising a transducer member in the form of a substantial cylindrical hollow body open at both ends and capable of vibrating radially and longitudinally with respect to its axis which is substantially parallel to the longitudinal axis of the support member, a convexly curved cap of rigid material rigidly secured to, and substantially closing, one end of said hollow body, for generating acoustic waves in response to the longitudinal vibrations of the transducer member or inducing longitudinal vibrations in the transducer member upon receiving acoustic waves from the surrounding medium, to improve the acoustic coupling of the transducer with the surrounding medium in directions which are between the directions of vibration of said transducer member and have a directivity pattern substanially symmetrical with respect to the transducer axis, and energy-reflecting means mechanically coupled to the other end of said hollow body wherein;
said hollow body is made from a piezoelectric material and has two axially separated electrodes provided on one of its surfaces, wherein
said at least one transducer is the emitting transducer and said exciting means includes means operative to effectively phase-advance by a small amount of first few vibrations of that part of the body between the pair of electrodes comprising the further of the two axially separated electrodes from the receiving transducer and an electrode on the other surface of the body with respect to the first few vibrations of the remainder of the body, whereby to reduce phase distortion errors at the receiving transducer.

23. The apparatus of claim 22, wherein said phase-advancing means comprises inductances of different values connected respectively in series with each of said two axially separated electrodes.

24. The apparatus of claim 23, wherein said at least one transducer is the emitting transducer and said exciting means includes means operative to effectively phase-advance by a small amount the first few vibrations of that part of the body surrounded by the coil further from the receiving transducer with respect to the first few vibrations of the remainder of the body, whereby to reduce phase distortion errors at the receiving transducer.

25. The apparatus of claim 24, wherein, said exciting means is connected to excite said cap so that this cap vibrates substantially in phase with the part of the part of the hollow body nearer thereto.

26. The apparatus of claim 22, wherein said cap is made from a piezo-electric material and has one electrode provided on each of its external and internal surfaces.

27. The apparatus of claim 22, further comprising a second transducer member which is a hollow body similar to but smaller in diameter than, the first-mentioned hollow body and mounted coaxially inside said first body, and a second coaxially curved cap of rigid material, which is rigidly secured to, and substantially closes, one of the ends of said second body, said energy-reflecting means being also mechanically coupled to the other end of said second body.

28. The apparatus of claim 27, wherein said exciting means is arranged to excite the second body so that this body vibrates substantially in phase with the first body.

* * * * *